United States Patent
Nakamichi (10) Patent No.: US 10,488,781 B2
(45) Date of Patent: Nov. 26, 2019

(54) EXPOSING DEVICE AND IMAGE FORMING APPARATUS

(71) Applicant: Oki Data Corporation, Tokyo (JP)

(72) Inventor: Ren Nakamichi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/217,520

(22) Filed: Dec. 12, 2018

(65) Prior Publication Data

US 2019/0196356 A1 Jun. 27, 2019

(30) Foreign Application Priority Data

Dec. 22, 2017 (JP) .................................. 2017-246387

(51) Int. Cl.
| | | |
|---|---|---|
| *G03G 15/04* | (2006.01) | |
| *G02B 7/02* | (2006.01) | |
| *G02B 3/00* | (2006.01) | |
| *G03G 15/32* | (2006.01) | |

(52) U.S. Cl.
CPC ..... *G03G 15/04054* (2013.01); *G02B 3/0056* (2013.01); *G02B 7/028* (2013.01); *G03G 15/326* (2013.01)

(58) Field of Classification Search
CPC .. G03G 15/04; G03G 15/043; G03G 15/0435; G03G 15/04036; G03G 15/04045; G03G 15/04054; G03G 2215/0402; G03G 2215/0407; G03G 2215/0409
See application file for complete search history.

(56) References Cited

U.S. PATENT DOCUMENTS

2013/0314680 A1* 11/2013 Yamamura ............. G02B 3/005
355/67

FOREIGN PATENT DOCUMENTS

JP 2013-015847 A 1/2013

* cited by examiner

*Primary Examiner* — Thomas S Giampaolo, II
(74) *Attorney, Agent, or Firm* — Metrolex IP Law Group, PLLC (57) ABSTRACT

An exposing device according to an embodiment includes: a light emitter; a first light blocking member including first apertures; a first lens array including first lenses, wherein each of the first lenses converges the light passing through the corresponding first aperture; a second light blocking member including second apertures; and a second lens array including second lenses, wherein each of the second lenses converges the light passing through the corresponding second aperture. An optical axis of each of the first lenses and an optical axis of the corresponding one of the second lenses substantially coincide with each other. A first aperture center of each of the first apertures and a second aperture center of the corresponding second aperture are disposed at a predetermined distance from the optical axis of the corresponding first lens and the optical axis of the corresponding second lens in an array direction of the light emitter.

10 Claims, 9 Drawing Sheets

LIGHT BLOCKING MEMBER INCLUDING IDEAL APERTURE SECTION

FIG. 10

OPTICAL PATH IN LENS UNIT OF COMPARATIVE EXAMPLE

EFFECTIVE APERTURE SECTION

EXPOSING DEVICE AND IMAGE FORMING APPARATUS

CROSS REFERENCE TO RELATED APPLICATIONS

This application claims priority based on 35 USC 119 from prior Japanese Patent Application No. JP2017-246387 filed on Dec. 22, 2017, entitled "EXPOSING DEVICE AND IMAGE FORMING APPARATUS", the entire contents of which are incorporated herein by reference.

BACKGROUND

This disclosure relates to an exposing device and an image forming apparatus and is suitably applied to, for example, an exposing device mounted on an electrophotographic image forming apparatus.

As an image forming apparatus of related art, there is an image forming apparatus that irradiates the surface of a photosensitive drum with light from an exposing device, which emits light for exposure, to form an electrostatic latent image on the surface of the photosensitive drum, deposits toner on the electrostatic latent image to develop a toner image, and performs printing of the image. As the exposing device, for example, there is a light emitting diode (LED) head that uses light emitted from an LED which is a light emitting element.

As the LED head, for example, there is an LED head including board mounted with an LED array in which LEDs are linearly disposed, a lens unit in which lenses for condensing lights emitted from the LEDs are arrayed, a holder that holds the board and the lens unit, and a base that presses the board against the holder. Light emitted from the LED array mounted on the board is converged by passing through the lens unit. Then, the light is applied to the surface of a photosensitive drum disposed in a focusing position of the lens unit, whereby an electrostatic latent image is formed.

As such a lens unit, there is a lens unit in which a lens array including an array of microlenses and a light blocking member for suppressing stray light are stacked one on top of the other (e.g., Patent Document 1).

Patent Document 1: Japanese Patent Application Publication No. 2013-15847.

SUMMARY

Some light blocking member is difficult to manufacture because apertures for allowing light to pass while suppressing stray light each have a complicated aperture shape such as a semilunar shape, an elliptical shape, or an oval shape. Having such aperture shapes entails manufacturing of the light blocking member having a complicated shape suited to an array pitch and a diameter in a lens array to be manufactured. Therefore, the production of a mold for the light blocking member is difficult and expensive.

An object of an aspect of the disclosure is to propose an exposing device and an image forming apparatus, configurations of which can be simplified.

A first aspect of the disclosure is an exposing device that includes: a light emitter; a first light blocking member that is opposed to the light emitter, includes first apertures, and blocks a part of light emitted from the light emitter; a first lens array in which first lenses are disposed, wherein each of the first lenses converges the light passing through the corresponding first aperture; a second light blocking member that is disposed on an opposite side of the first blocking member with respect to the first lens array, includes second apertures, and blocks a part of the light coming from the first lenses; and a second lens array in which second lenses are disposed, wherein each of the second lenses converges the light passing through the corresponding second aperture. An optical axis of each of the first lenses and an optical axis of the corresponding one of the second lenses substantially coincide with each other. A first aperture center of each of the first apertures and a second aperture center of the corresponding second aperture are disposed at a predetermined distance from the optical axis of the corresponding first lens and the optical axis of the corresponding second lens in an array direction of the light emitter.

A second aspect of the disclosure is an image formation apparatus that includes the exposing device according to the first aspect.

According to at least one of the above aspects, it is possible to limit light made incident on a peripheral edge portion of a lens in a lens array, although an aperture of a light blocking member is simply configured, and improve optical performance.

Therefore, it is possible to realize an exposing device, a configuration of which can be simplified.

DETAILED DESCRIPTION

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

[1. Embodiment]

[1-1. Configuration of a Color Printer]

Figure 1:
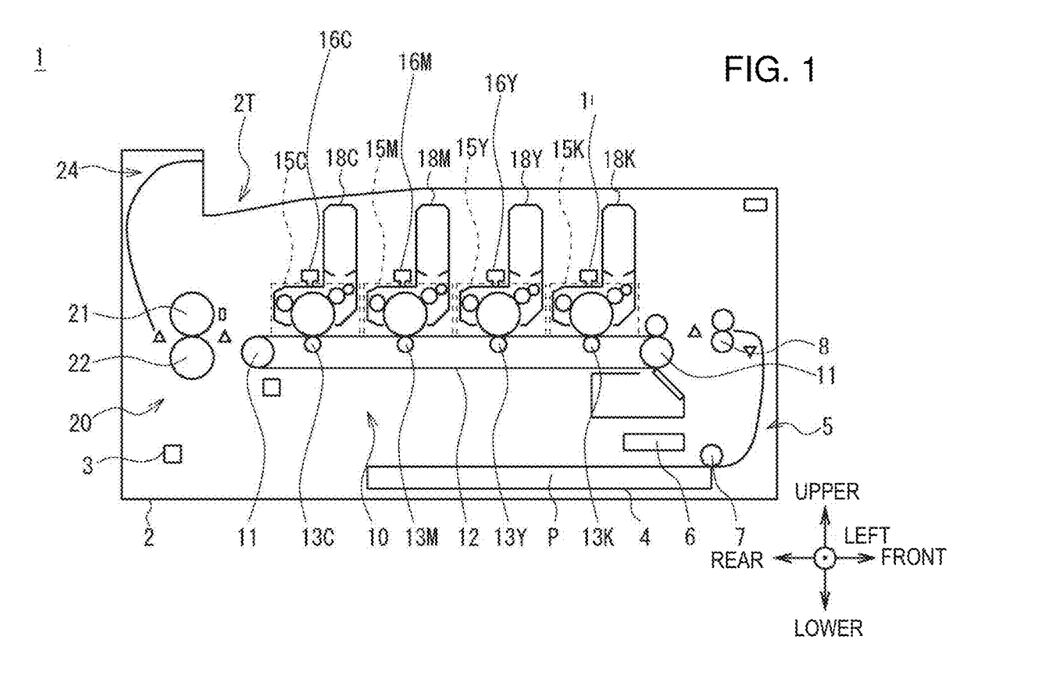
FIG. 1 is a left side view illustrating the configuration of a color printer.

As illustrated in a left side view of FIG. 1, a color printer 1 is an electrophotographic printer for color. The color printer 1 prints a desired color image on paper P having a size of, for example, an A3 size or an A4 size. In the color printer 1 functioning as an image forming apparatus, various components are disposed on the inside of a printer housing 2 formed in a substantial box shape. Incidentally, in the following explanation, a right end portion in FIG. 1 is set as a front surface of the color printer 1. An up-down direction, a left-right direction, and a front-rear direction viewed on the front surface are respectively defined. The entire color printer 1 is collectively controlled by a control section 3. The control section 3 is connected to a host apparatus (not illustrated in FIG. 1) such as a personal computer by radio or wire via a not-illustrated communication processing section. When image data representing a printing target color image is given and printing of the color image is instructed from the host apparatus, the control section 3 executes print processing for forming a print image on the surface of the paper P.

In a lowest section in the printer housing 2, a paper storage cassette 4 that stores the paper P, a paper feeding section 5 that separates the paper P stored in a stacked state in the paper storage cassette 4 sheet by sheet and feeds the paper P, and a paper-color measuring section 6 that measures a color of the paper P are provided. The paper feeding section 5 is located on a front end upper side of the paper storage cassette 4. The paper feeding section 5 is configured by, for example, a guide that guides the paper P in addition to rollers such as a hopping roller 7 provided on the front end upper side of the paper storage cassette 4 with the center axis of the hopping roller 7 directed in the left-right direction and a registration roller 8 provided above the hopping roller 7.

The paper feeding section 5 rotates the hopping roller 7, the registration roller 8 and the like according to the control by the control section 3, separates the paper P stored in the paper storage cassette 4 sheet by sheet, and takes the paper P into the paper feeding section 5. After advancing the taken-in paper P front upward, the paper feeding section 5 advances the paper P to return backward in a position vertically substantially in the center near the front end in the printer housing 2. The paper-color measuring section 6 measures a color of the paper P and supplies a result of the measurement to the control section 3.

Above the paper storage cassette 4 in the printer housing 2, a transfer belt unit 10 is provided to largely traverse the inside of the printer housing 2 to the front and the rear. In the transfer belt unit 10, a roller 11 formed in an elongated cylindrical shape with the center axis of the roller 11 directed in the left-right direction is disposed one each in the front and the rear. A transfer belt 12 is looped around the front and rear rollers 11. The transfer belt 12 has a large width in the left-right direction and is formed as an endless belt. The transfer belt 12 travels according to rotation of the roller 11. The transfer belt unit 10 causes the transfer belt 12 to travel by rotating the roller 11 on the basis of the control by the control section 3. The transfer belt unit 10 places the paper P passed from the paper feeding section 5 on the upper surface of the transfer belt 12 and conveys the paper P in the rear direction.

Figure 2:
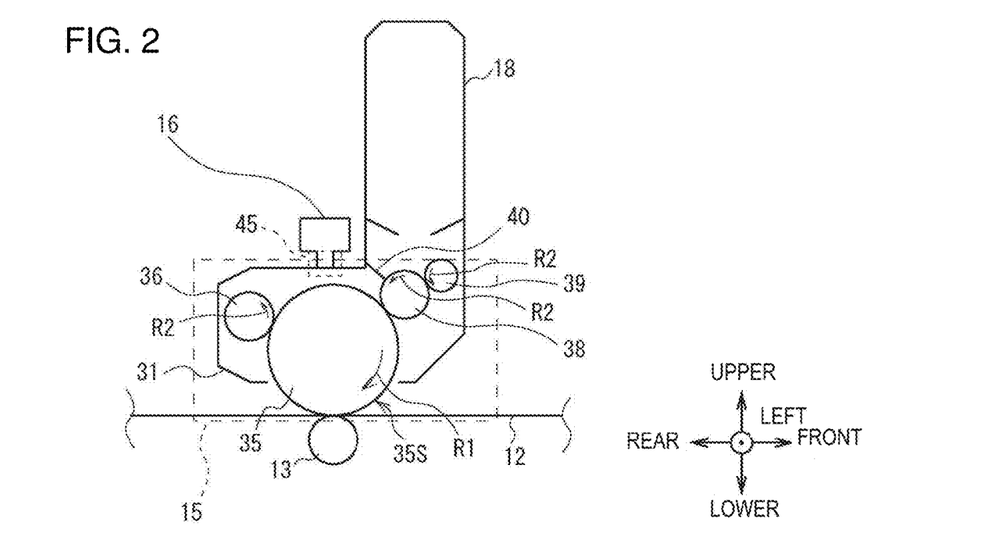
FIG. 2 is a left side view illustrating the configuration of an image forming unit.

On the other hand, on the upper side of the transfer belt unit 10, that is, above the center in the printer housing 2, four image forming units 15C, 15M, 15Y, and 15K (hereinafter collectively referred to as image forming units 15) illustrated in FIG. 2 are disposed in order from the rear side toward the front side. That is, the image forming units 15 of the colors are disposed in a so-called tandem type. The image forming units 15C, 15M, 15Y, and 15K respectively correspond to the colors of cyan (C), magenta (M), yellow (Y), and black (K). The image forming units 15C, 15M, 15Y, and 15K are configured the same one another. Only the colors of toners corresponding to the image forming units 15C, 15M, 15Y, and 15K are different from one another. The image forming units 15 are formed in a substantial box shape relatively long in the left-right direction to correspond to the left to right width of the paper P.

In the printer housing 2, LED heads 16C, 16M, 16Y, and 16K (hereinafter collectively referred to as LED heads 16) are provided to respectively correspond to the image forming units 15C, 15M, 15Y, and 15K. The LED heads 16 are configured in a rectangular parallelepiped shape elongated in the left-right direction. LEDs are disposed side by side along the left-right direction on the insides of the LED heads 16. The LED heads 16 cause the LEDS to emit lights in light emission patterns corresponding to image data supplied from the control section 3. When the image forming units 15 are mounted on the printer housing 2, the image forming units 15 are extremely close to the LED heads 16. Exposure processing is performed by lights from the LED heads 16.

Toner cartridges 18C, 18M, 18Y, and 18K (hereinafter collectively referred to as toner cartridges 18) are respectively connected above the image forming units 15C, 15M, 15Y, and 15K. The toner cartridges 18 are hollow containers long in the left-right direction. The toners of the colors in a powder state are respectively stored in the toner cartridges 18. Predetermined agitating mechanisms are incorporated in the toner cartridges 18. Incidentally, in the transfer belt unit 10, transfer rollers 13C, 13M, 13Y, and 13K (hereinafter collectively referred to as transfer rollers 13) are provided in four places right under the image forming units 15 between the front and rear rollers 1. That is, the image forming units 15 hold an upper side portion of the transfer belt 12 between the image forming units 15 and the transfer rollers 13. Incidentally, the transfer rollers 13 are configured to be chargeable.

The control section 3 causes the toner cartridges 18 to supply the toners to the image forming units 15. At the same time, the control section 3 causes the LED heads 16 to emit lights to form light emission patterns corresponding to image data supplied from the host apparatus (not illustrated in FIG. 1). The image forming units 15 form toner images corresponding to the light emission patterns of the LED heads 16 using the toners supplied from the toner cartridges 18 and transfer the toner images respectively onto the paper P (explained in detail below). Consequently, the toner images of the four colors corresponding to the image data are sequentially transferred onto the paper P conveyed by the transfer belt unit 10.

A fixing unit 20 is provided near the vertical center behind the transfer belt unit 10, that is, near the rear end of the printer housing 2. The fixing unit 20 is configured by a heating roller 21 and a pressurizing roller 22. The heating roller 21 is formed in a cylindrical shape with the center axis of the heating roller 21 directed in the left-right direction. A heater is provided on the inside of the heating roller 21. The pressurizing roller 22 is formed in the same cylindrical shape as the heating roller 21. The pressurizing roller 22 presses the surface on the upper side of the pressurizing roller 22 against the surface on the lower side of the heating roller 21 with a predetermined pressing force. The fixing unit 20 heats the heating roller 21 and rotates the heating roller 21 and the pressurizing roller 22 respectively in predetermined directions on the basis of the control by the control section 3. Consequently, the fixing unit 20 applies heat and pressure to the paper P passed from the transfer belt unit 10, that is, the paper P on which the toner images of the four colors are laid one on top of another to fix the toners and passes the paper further rear upward.

A paper discharging section 24 is disposed in behind and above the fixing unit 20. The paper discharging section 24 is configured by a combination of rollers (not illustrated in FIG. 1) with the center axis of the paper discharging section 24 directed in the left-right direction, a guide that guides paper, and the like. The paper discharging section 24 rotates the rollers as appropriate according to the control by the control section 3 to thereby convey the paper P passed from the fixing unit 20 rear upward, then, returns the paper P toward the front, and discharges the paper P to a discharge tray 2T formed on the upper surface of the printer housing 2.

In this way, when executing the print processing, the color printer 1 causes the LED heads 16 to emit lights to thereby form the toner images respectively with the image forming units 15 of the colors and sequentially transfers the toner images onto the paper P.

[1-2. Configuration of the Image Forming Unit]

The configuration of the image forming unit 15 is explained. As illustrated in FIG. 2, a most part in the outer periphery of the image forming unit 15 is closed by a frame 31. A relatively large space is formed on the inside of the image forming unit 15.

A photosensitive drum 35 is provided in the center and closer to the bottom in the image forming unit 15. The photosensitive drum 35 is formed in a cylindrical shape with the center axis of the photosensitive drum 35 directed to the left-right direction. The photosensitive drum 35 is supported by the frame 31 rotatably around the center axis. Incidentally, a driving force is transmitted to the photosensitive drum 35 from a not-illustrated motor, whereby the photosensitive drum 35 rotates in an arrow R1 direction.

A portion forming the lower surface of the photosensitive drum 35 in the frame 31 is opened over a relatively wide range. Therefore, when the image forming unit 15 is mounted on the printer housing 2 (FIG. 1), the lower surface of the photosensitive drum 35 is in contact with the transfer belt 12 or the paper P placed on the transfer belt 12. An exposure hole elongated in the left-right direction is drilled in a portion right above the photosensitive drum 35 in the frame 31.

A charging roller 36 formed in a cylindrical shape having a smaller diameter than the photosensitive drum 35 is provided behind and above the photosensitive drum 35. The charging roller 36 is configured by, for example, a semiconductive elastic member. The circumferential side surface of the charging roller 36 is in contact with a circumferential side surface 35S of the photosensitive drum 35. The charging roller 36 uniformly charges a contact part of the circumferential side surface 35S.

A developing roller 38 formed in a cylindrical shape having a diameter smaller than the photosensitive drum 35 is provided in front of and above the photosensitive drum 35. The developing roller 38 is configured by, for example, semiconductive urethane rubber, electrical resistance of which is adjusted as appropriate by adding a conductive substance such as carbon to a urethane rubber material. The developing roller 38 can be charged. The circumferential side surface of the developing roller 38 is in contact with a circumferential side surface 35S of the photosensitive drum 35 on the rear side and is in contact with a supply roller 39 formed in a cylindrical shape having a diameter slightly smaller than the developing roller 38 on the front side. The supply roller 39 is configured by, for example, semiconductive foamed silicone sponge.

A thin plate-like developing blade 40 is provided behind and above the developing roller 38. The developing blade 40 is configured by metal such as stainless steel or phosphor bronze or a rubber material such as silicon rubber. The rear upper end of the developing blade 40 is fixed in the frame 31. A slight gap is formed between the front lower end of the developing blade 40 and the circumferential side surface of the developing roller 38.

Spacers 45 are provided on the left and right both sides above the photosensitive drum 35. The size, attaching positions to the frame 31, and the like of the spacers 45 are optimized. An interval between the circumferential side surface of the photosensitive drum 35 and the LED head 16 is adjusted to desired length by setting the lower surface of the LED head 16 in contact with the upper surfaces of the spacers 45.

In such a configuration, when printing an image on the paper P, the image forming unit 15 rotates the photosensitive drum 35 in the arrow R1 direction on the basis of the control by the control section 3, rotates the charging roller 36, the developing roller 38, and the supply roller 39 in an arrow R2 direction, and charges the charging roller 36 and the developing roller 38.

In the photosensitive drum 35, first, a rear upper side portion of the circumferential side surface 35S is uniformly charged by the charging roller 36. The photosensitive drum 35 rotates in the arrow R1 direction to cause the charged portion to reach near the upper end to be opposed to the LED head 16. At this time, the circumferential side surface 35S of the photosensitive drum 35 is irradiated with light of a light emission pattern corresponding to image data from the LED head 16, whereby the circumferential side surface 35S is exposed to the light. An electrostatic latent image corresponding to the image data is formed on the circumferential side surface 35S.

On the other hand, toner supplied from the toner cartridge 18 is deposited on the circumferential side surface of the developing roller 38, which rotates in the arrow R2 direction, by the supply roller 39. Subsequently, excess toner is shaved off by the developing blade 40. Therefore, the toner is deposited on the circumferential side surface in a uniform thin film shape.

The photosensitive drum 35 further rotates in the arrow R1 direction to thereby deposit the toner, which is formed in the thin-film shape on the circumferential side surface of the developing roller 38, on the circumferential side surface 35S only in a place corresponding to the electrostatic latent image near the front end in contact with the developing roller 38. Consequently, a toner image corresponding to the image data is formed on the circumferential side surface 35S of the photosensitive drum 35. Incidentally, at this time, the toner image formed on the circumferential side surface 35S is an image representing only a component of one color (i.e., any one of cyan, magenta, yellow, and black) formed by the image forming unit 15 in an image that should be finally printed.

Thereafter, the photosensitive drum 35 further rotates in the arrow R1 direction to thereby cause the toner image to reach near the lower end. At this time, the control section 3 causes, with the transfer belt unit 10 (FIG. 1), the paper P to reach the lower side of the image forming unit 15 and charges the transfer roller 13 to a characteristic opposite to the characteristic of the toner. Therefore, the image forming unit 15 holds the paper P between the portion where the toner image is formed on the photosensitive drum 35 and the charged transfer roller 13. The image forming unit 15 transfers the toner image onto the paper P. Incidentally, when the toner remains on the circumferential side surface 35S of the photosensitive drum 35 after the toner image is transferred to the paper P, the toner is removed by a not-illustrated cleaning device.

Consequently, the image forming unit 15 opposes the LED head 16 to the vicinity of the photosensitive drum 35 and forms the toner image on the circumferential side surface 35S with exposing action of the LED head 16.

[1-3. Configuration of the LED Head]

Figure 3:
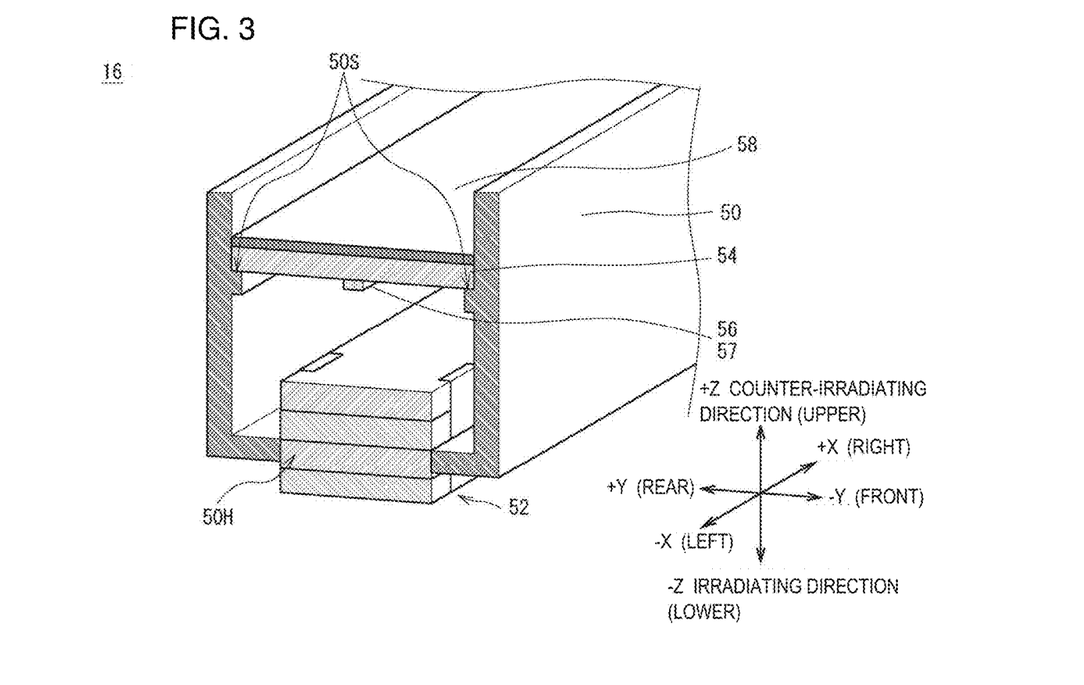
FIG. 3 is a cross sectional view illustrating the configuration of a LED head.
Figure 5:
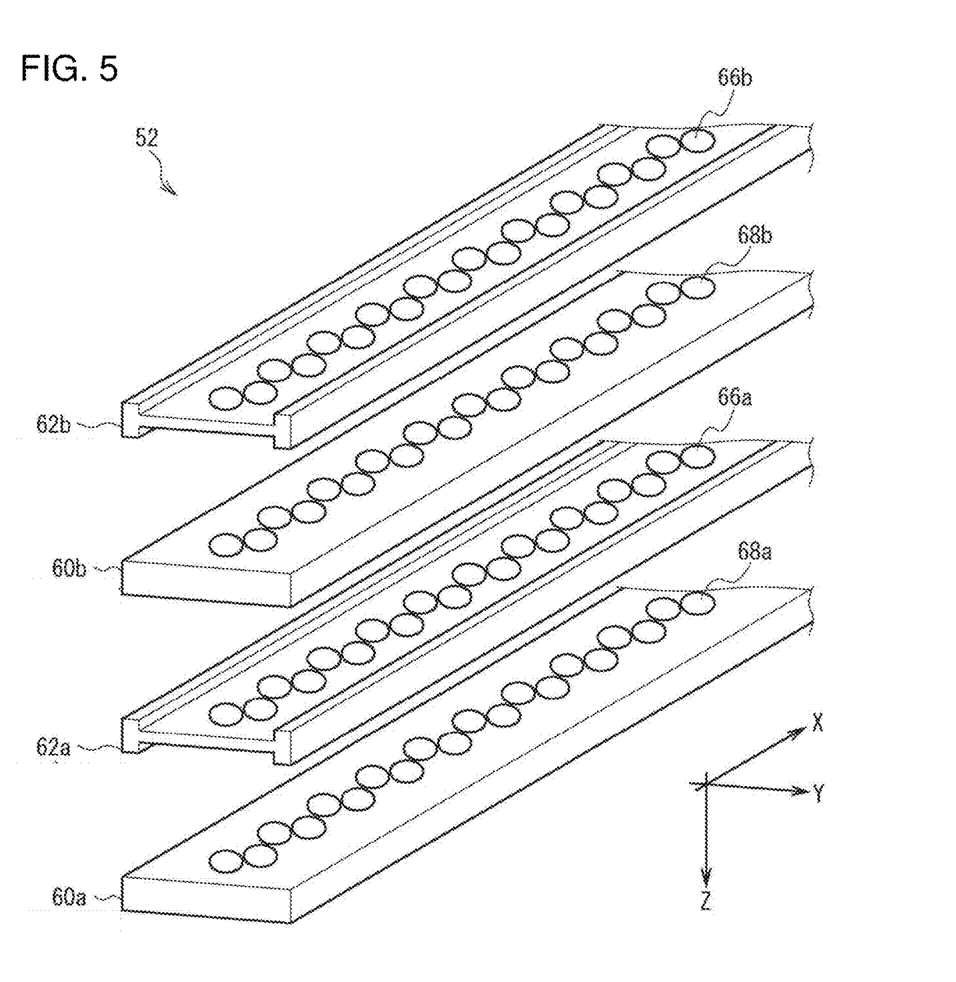
FIG. 5 is an exploded perspective view illustrating the configuration of the lens unit.

The configuration of the LED head 16 is explained with reference to FIG. 3. FIG. 3 is a schematic cross sectional view of the LED head 16. The LED head 16 is formed in a rectangular parallelepiped shape elongated in the left-right direction as a whole. The LED head 16 has a configuration in which a lens unit 52 and a board 54 are attached to a head holder 50. In the following explanation, the lower direction in FIG. 5 is referred to as irradiating direction as well and the upper direction in FIG. 5 is referred to as counter-irradiating direction as well. In the following explanation, the left-right direction is referred to as longitudinal direction (arraying direction and main scanning direction) as well. The front-rear direction crossing the left-right direction is referred to as sub-scanning direction as well. The up-down direction is referred to as optical axis direction as well. Further, the left-right direction, which is the array direction of an LED array 56, is set as an X direction. The up-down direction, which is the optical axis direction of a lens array 62, is set as a Z direction. The front-rear direction, which is a direction orthogonal to the X direction and the Z direction is set as a Y direction.

The head holder 50 has, as a whole, a shape obtained by removing a side surface on the counter-irradiating direction side from a hollow square pole formed along the left-right direction. The cross section of the head holder 50 has a shape like a capital letter "U". An attachment hole 50H formed by an elongated long hole along the left-right direction and piercing in the up-down direction is formed near the center of an irradiating direction side portion in the head holder 50.

The lens unit 52 is inserted into and attached to the attachment hole 50H. Consequently, the lens unit 52 is supported by the head holder 50. The lens unit 52 is formed in a rectangular parallelepiped shape elongated in the left-right direction as a whole. The lens unit 52 holds a large number of microlenses, optical axes of which are extended in the up-down direction, side by side in the left-right direction. The microlenses are disposed to direct the optical axes in the up-down direction. The microlenses have an optical characteristic for converging light radiated from the LED array 56 explained below. The lend unit 52 is fixed to the head holder 50 at a position where an incident distance between an upper surface, which is an end face of the lens unit 52 receiving incident light, and a lower surface, which is the surface of the LED array 56, is an optimum value in terms of characteristics of the lens unit 52. The light emitted from the LED array 56 is converged by the lens unit 52 and exposed on the charged photosensitive drum 35 (FIG. 2) to thereby form an electrostatic latent image.

The board 54 is attached to the head holder 50 above the lens unit 52 with the longitudinal direction extended along the left-right direction to be in contact with contact sections 50S. The board 54 is formed by a so-called glass epoxy board and formed in a plate shape elongated in the left-right direction and thin in the up-down direction. The board 54 has a configuration in which wiring layers, on which predetermined wiring patterns are formed, are stacked in the up-down direction. On the irradiating direction side, which is the lower surface of the board 54, the LED array 56 is mounted along the longitudinal direction of the board 54 to be opposed to the lens unit 52 substantially in the center in the front-rear direction. In the LED array 56, LED elements 57 that emit lights downward are disposed side by side at a predetermined very small interval along the array direction, which is the left-right direction.

Consequently, the LED head 16 generates an electrostatic latent image formed at resolution of 600 [dpi] on the circumferential side surface of the photosensitive drum 35 (FIG. 2). In the embodiment, since the LED head 16 has the resolution of 600 [dpi], six hundred LED elements 57 are disposed per one inch. That is, the LED elements 57 are arrayed at an interval of 0.0423 [mm] in the X direction.

The entire surface of the board 54 on the counter-irradiating direction side is covered by an insulation sheet 58, whereby exposure of the board 54 to the outside is prevented. The insulation sheet 58 is configured by a material having insulation made of polyester such as a Mylar (registered trademark) sheet and is formed in a film shape thin in the up-down direction, narrower than the board 54 in the front-rear direction, and long in the left-right direction.

[1-4. Configuration of the Lens Unit]

Figure 4:
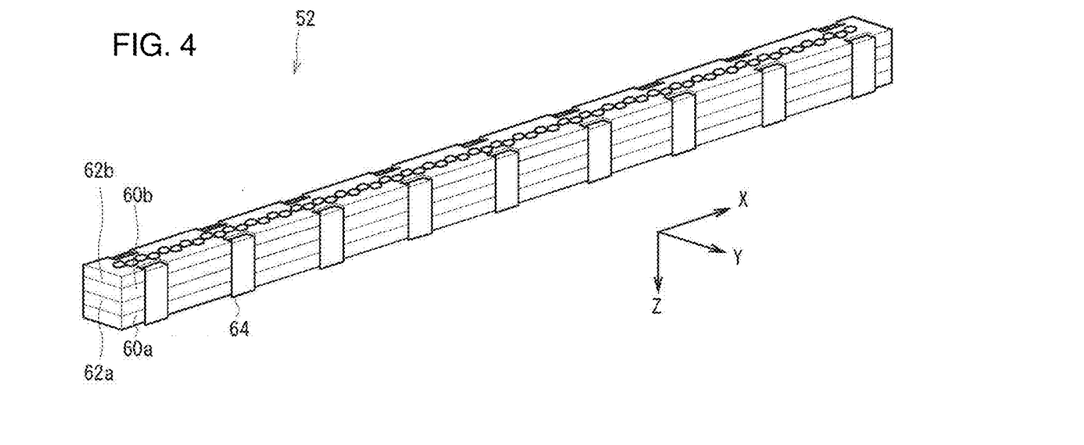
FIG. 4 is a perspective view illustrating an overall configuration of a lens unit.

As illustrated in FIGS. 4 and 5, the lens unit 52 has a configuration in which a light blocking member 60a, a lens array 62a, a light blocking member 60b, and a lens array 62b are stacked in order along the Z direction from a +Z-direction side, which is a positive side in the Z direction, toward a −Z-direction side, which is a negative side in the Z direction. Holding members 64 are attached to the lens unit 52.

The holding members 64 hold eighteen places in total including nine places on each one side at the end portion in the Y direction of the lens unit 52 to fix the light blocking member 60a, the lens array 62a, the light blocking member 60b, and the lens array 62b in a state in which the light blocking member 60a, the lens array 62a, the light blocking member 60b, and the lens array 62b are held in the Z direction by the action of an elastic force. As a result, a relative positional relation in the Z direction among the light blocking member 60a, the lens array 62a, the light blocking member 60b, and the lens array 62b is decided. The holding members 64 are fixed to the head holder 50 (FIG. 3) by an adhesive to thereby fix the lens unit 52 to the head holder 50. In the following explanation, the lens arrays 62a and 62b are collectively referred to as lens arrays 62 as well. The light blocking members 60a and 60b are collectively referred to as light blocking members 60 as well.

In the lens array 62a as a whole, substantially circular microlenses 66a are substantially linearly arrayed side by side in two rows in parallel along the array direction, which is the X direction. Positions in the Y direction of the microlenses 66a adjacent to each other in the X direction deviate from each other. Consequently, in the lens array 62a, the microlenses 66a are alternately disposed on substantially straight lines of the parallel two rows, that is, in a zigzag. The microlenses 66a are formed by a material that transmits light of the LED element 57. A lens optical axis LAa (FIG. 11), which is an optical axis of light passing through the microlens 66a, is located in the center of the microlens 66a.

In the lens array 62b as a whole, substantially circular microlenses 66b having the same shape as the microlenses 66a of the lens array 62a are substantially linearly arrayed side by side in two rows in parallel along the array direction, which is the X direction. Positions in the Y direction of the microlenses 66b adjacent to each other in the X direction deviate from each other. Consequently, in the lens array 62b, the microlenses 66b are alternately disposed on substantially straight lines of the parallel two rows, that is, in a zigzag. The microlenses 66b are formed by a material that transmits light of the LED element 57. A lens optical axis LAb (FIG. 11), which is an optical axis of light passing through the microlens 66b is located in the center of the microlens 66b.

The lens array 62a and the lens array 62b are disposed to match the lens optical axis LAa of the microlens 66a and the lens optical axis LAb of the microlens 66b. In the following explanation, the microlenses 66a and 66b are collectively referred to as microlenses 66 as well. The lens optical axes LAa and LAb are collectively referred to as lens optical axes LA.

The lens arrays 62 are disposed such that one of the lens arrays 62 (e.g., the lens array 62b) turns round by 180 degrees, relative to the other lens array 62 (e.g., the lens array 62a), about a Y axis extending in the sub-scanning direction (the Y direction) orthogonal to the array direction (the X direction) and the optical axis direction (the Z direction). Consequently, in the LED head 16, it is possible to configure the lens array 62a and the lens array 62b from the same members while aligning the positions of the lens optical axis LAa of the lens array 62a and the lens optical axis LAb of the lens array 62b.

Figure 11:
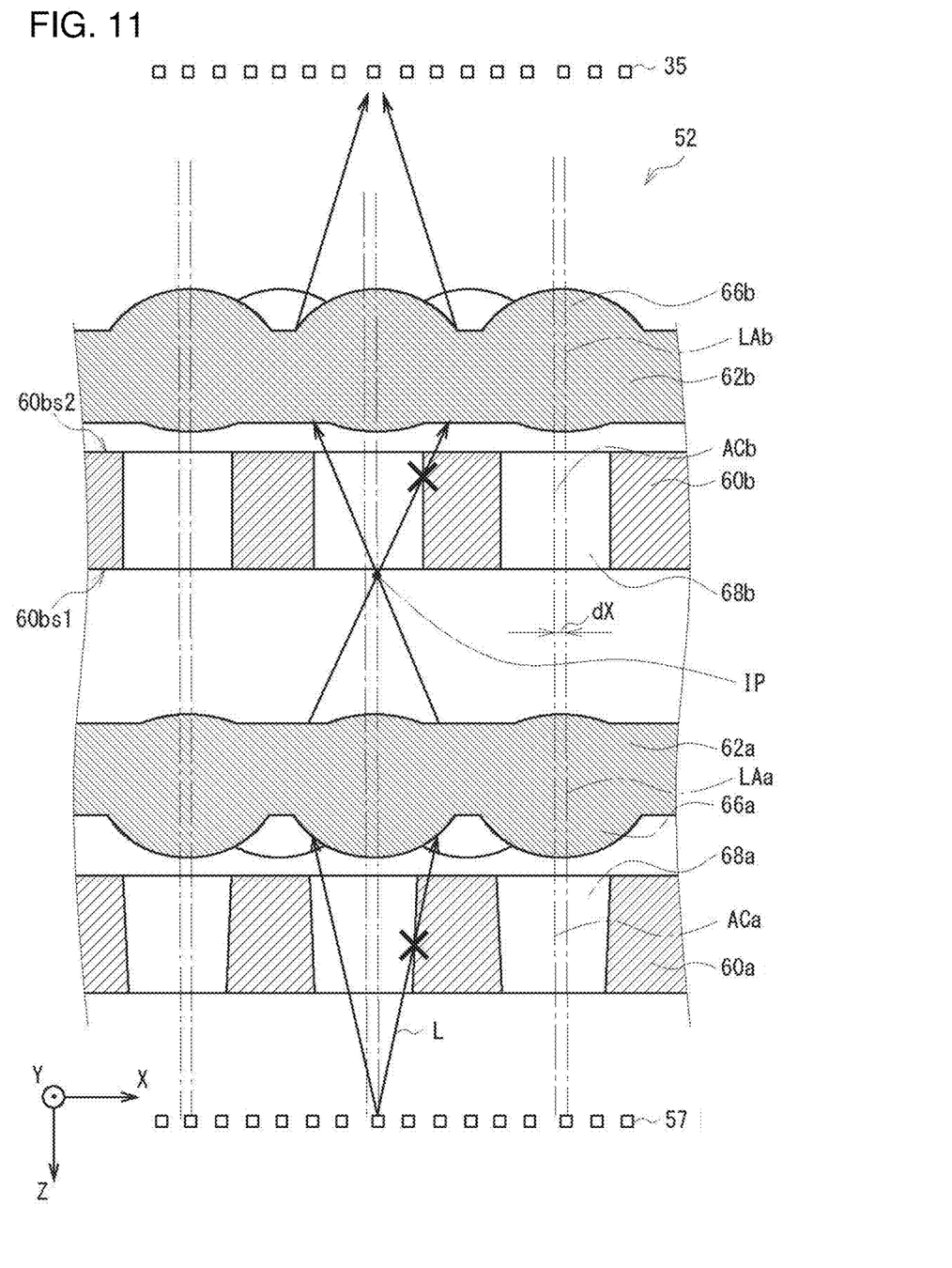
FIG. 11 is a sectional view illustrating an optical path in a lens unit according to the embodiment.

In the light blocking member 60a as a whole, substantially columnar aperture sections 68a are substantially linearly arrayed side by side in two rows in parallel along the array direction, which is the X direction. Positions in the Y direction of the aperture sections 68a adjacent to each other in the X direction deviate from each other. Consequently, in the light blocking member 60a, the aperture sections 68a are alternately disposed on substantially straight lines of the parallel two rows, that is, in a zigzag. The light blocking member 60a is formed by injection molding using polycarbonate. The light blocking member 60a blocks the light of the LED element 57. The aperture sections 68a are formed as through-holes, which transmit the light of the LED element 57, to correspond to the disposition of the microlenses 66a of the lens array 62a. The center (i.e., the center of gravity) of the aperture section 68a is an aperture center ACa (FIG. 11).

In the light blocking member 60b as a whole, substantially columnar aperture sections 68b are substantially linearly arrayed side by side in two rows in parallel along the array direction, which is the X direction. Positions in the Y direction of the aperture sections 68b adjacent to each other in the X direction deviate from each other. Consequently, in the light blocking member 60b, the aperture sections 68b are alternately disposed on substantially straight lines of the parallel two rows, that is, in a zigzag. The light blocking member 60b is formed by injection molding using polycarbonate. The aperture sections 68b are formed as through-holes, which transmit the light of the LED element 57, to correspond to the disposition of the microlenses 66b of the lens array 62b. The center (i.e., the center of gravity) of the aperture section 68b is an aperture center ACb (FIG. 11).

The light blocking member 60a and the light blocking member 60b are disposed to match the aperture center ACa of the aperture section 68a and the aperture center ACb of the aperture section 68b. In the following explanation, the aperture sections 68a and 68b are collectively referred to as aperture sections 68 as well. The aperture centers ACa and ACb are collectively referred to as aperture centers AC as well.

[1-5. Alignment of the Lens Unit]

In the lens unit 52, an aligning section including not-illustrated protrusions and recesses for deciding relative positions in the sub-scanning direction (the Y direction) in the light blocking member 60a, the lens array 62a, the light blocking member 60b, and the lens array 62b is formed. In the lens unit 52, the light blocking member 60a, the lens array 62a, the light blocking member 60b, and the lens array 62b are aligned in the Y direction such that not-illustrated protrusions provided in the same positions as the holding members 64 in the light blocking members 60a and 60b fit in not-illustrated recesses provided in the same positions as the holding members 64 in the lens arrays 62a and 62b, whereby the lens optical axis LAa, the aperture center ACa, the lens optical axis LAb, and the aperture center ACb substantially coincide with one another in the Y direction. As a result, a relative positional relation in the Y direction of the light blocking member 60a, the lens array 62a, the light blocking member 60b, and the lens array 62b is decided.

Figure 6:
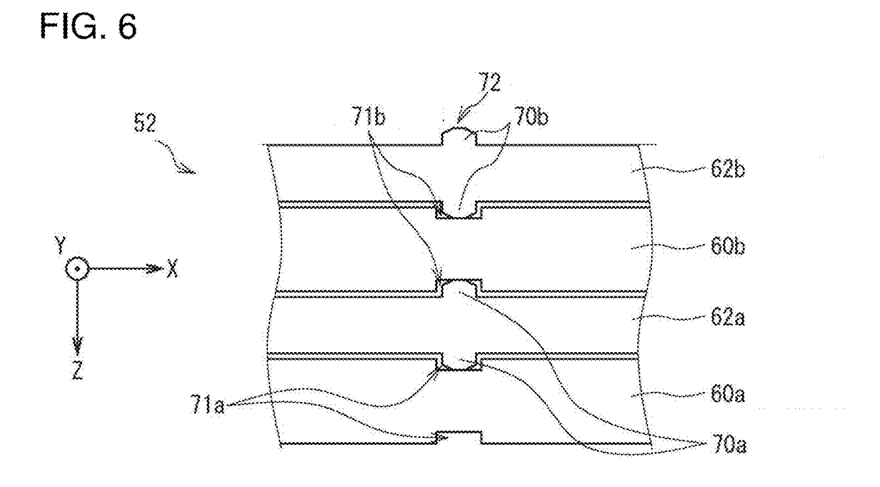
FIG. 6 is a rear view illustrating the configuration of an aligning section.

In the lens unit 52, an aligning section 72 including protrusions 70 (a protrusion 70a and a protrusion 70b) and recesses 71 (a recess 71a and a recess 71b) illustrated in FIG. 6 for deciding relative positions in the array direction (the X direction) of the light blocking member 60a, the lens array 62a, the light blocking member 60b, and the lens array 62b is formed. In the lens unit 52, the protrusions 70a and 70b provided in substantially the centers in the longitudinal direction (the X direction) of the lens arrays 62a and 62b fit in the recesses 71a and 71b provided in substantially the centers in the longitudinal direction (the X direction) of the light blocking members 60a and 60b, whereby the light blocking member 60a, the lens array 62a, the light blocking member 60b, and the lens array 62b are aligned in the X direction. In the lens unit 52, the light blocking member 60a, the lens array 62a, the light blocking member 60b, and the lens array 62b are aligned in the X direction in a state in which the positions in the X direction of the recesses 71 are slightly shifted in the X direction from the centers in the longitudinal direction (the X direction) of the light blocking members 60a and 60b, whereby the aperture center ACa and ACb deviate in the X direction from the lens optical axes LAa and LAb. As a result, a relative positional relation in the X direction of the light blocking member 60a, the lens array 62a, the light blocking member 60b, and the lens array 62b is decided.

A surface on a +Z side of the light blocking member 60b that is closer to the LED array 56 and that receives the light from the LED element 57 is referred to as a light-blocking-member light source-near side surface 60bs1 (FIG. 11). A surface on a −Z side of the light blocking member 60b that is farther from the LED array 56 and that outputs the light from the LED element 57 (i.e., a surface on the opposite side from the light-blocking-member light source-near side surface 60bs1) is referred to as a light-blocking-member light source-far side surface 60bs2 (FIG. 11).

[1-6. Configuration of the Lens Array]

Figure 7:
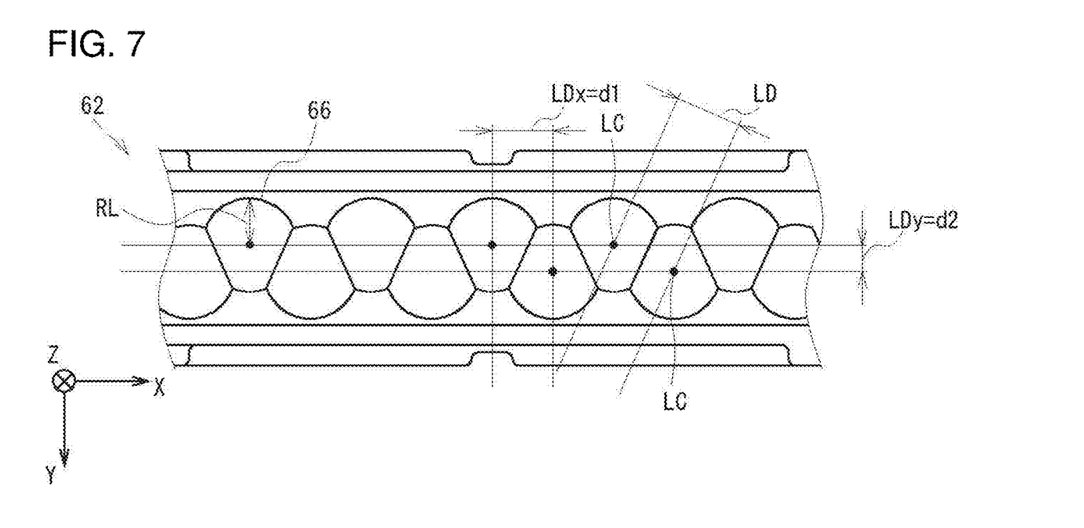
FIG. 7 is a bottom view illustrating the configuration of a lens array.

As illustrated in FIG. 7, in the lens array 62, the microlenses 66 having a lens radius RL are alternately disposed on substantially straight lines of parallel two rows, that is, in a zigzag. Lens centers LC, which are the centers in the microlenses 66, are disposed at an X-direction lens interval LDx in the X direction and a Y-direction lens interval LDy in the Y direction. Intervals in the X direction and the Y direction between the lens centers LC in the microlenses 66 adjacent to each other is a lens interval LD. A value of the X-direction lens interval LDx is a distance d1. A value of the Y-direction lens interval LDy is a distance d2. A value of the lens interval LD is calculated by Expression 1. The lens interval LD is smaller than a double of the lens radius RL. That is, d<2RL is satisfied.

$$d=\sqrt{(d1^2+d2^2)} \qquad (1)$$

In the lens array 62, the X-direction lens interval LDx and the Y-direction lens interval LDy are set shorter than a double of the lens radius RL of the microlenses 66. Therefore, the microlenses 66 adjacent to each other are disposed to overlap each other. Portions in contact with the microlenses 66 adjacent to each other are coupled in a shape cut by a plane parallel to an optical axis. Consequently, the microlenses 66 have a shape obtained by linearly shaving a part of the outer circumference of a circular shape when viewed from a direction along the optical axis.

[1-7. Configuration of the Light Blocking Member]

Figure 8:
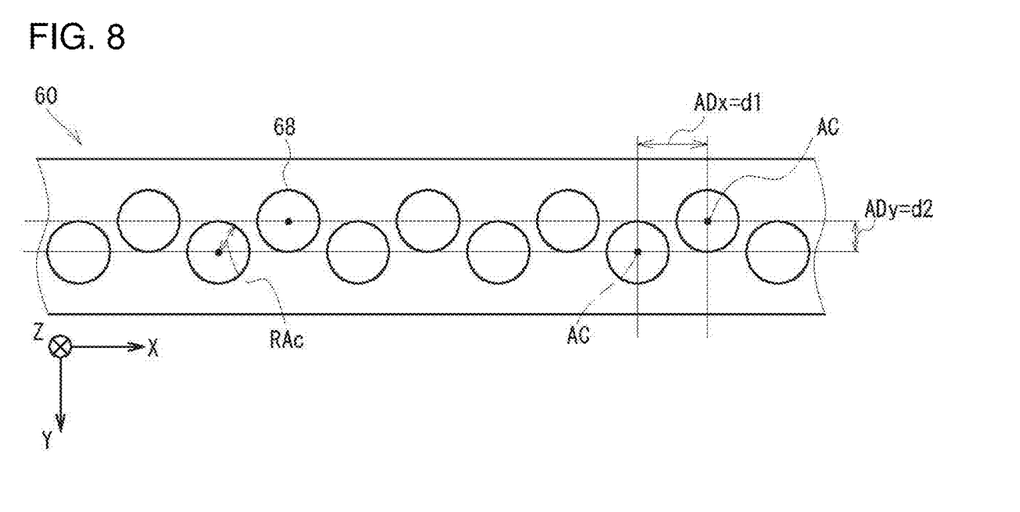
FIG. 8 is a bottom view illustrating a light blocking member according to an embodiment.

As illustrated in FIG. 8, in the light blocking member 60, the aperture sections 68 having an aperture radius RAc are alternately disposed on substantially straight lines of parallel two rows, that is, in a zigzag. Aperture centers AC in the aperture sections 68 are disposed at an X-direction aperture interval ADx in the X direction and a Y-direction aperture interval ADy in the Y direction. The X-direction aperture interval ADx is the distance d1 equivalent to the X-direction lens interval LDx. The Y-direction aperture interval ADy is the distance d2 equivalent to the Y-direction lens interval LDy.

Figure 9:
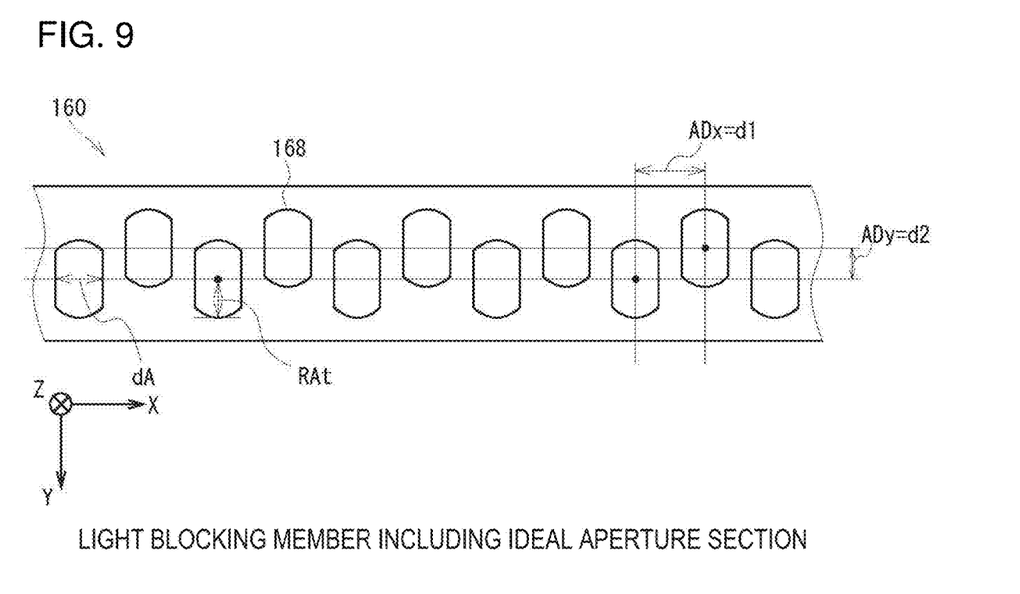
FIG. 9 is a bottom view illustrating a light blocking member including an ideal aperture section.

As in an ideal light blocking member 160 illustrated in FIG. 9, it is desirable to limit light made incident on the circumferential edge portions (boundary portions) of the microlenses 66 of the lens array 62 by ideally forming aperture sections 168 in a shape obtained by cutting a circle having an aperture radius RAt by straight lines parallel to each other to have an aperture width dA.

On the other hand, in the embodiment, the lens unit 52 includes the light blocking member 60 including the aperture sections 68, which are circular apertures having the aperture radius RAc illustrated in FIG. 8. Consequently, it is possible to simplify the shape of the aperture section 68 and reduce difficulty in manufacturing a mold for manufacturing the light blocking member 60 with injection molding.

[1-8. Optical Path in a Comparative Example]

Figure 10:
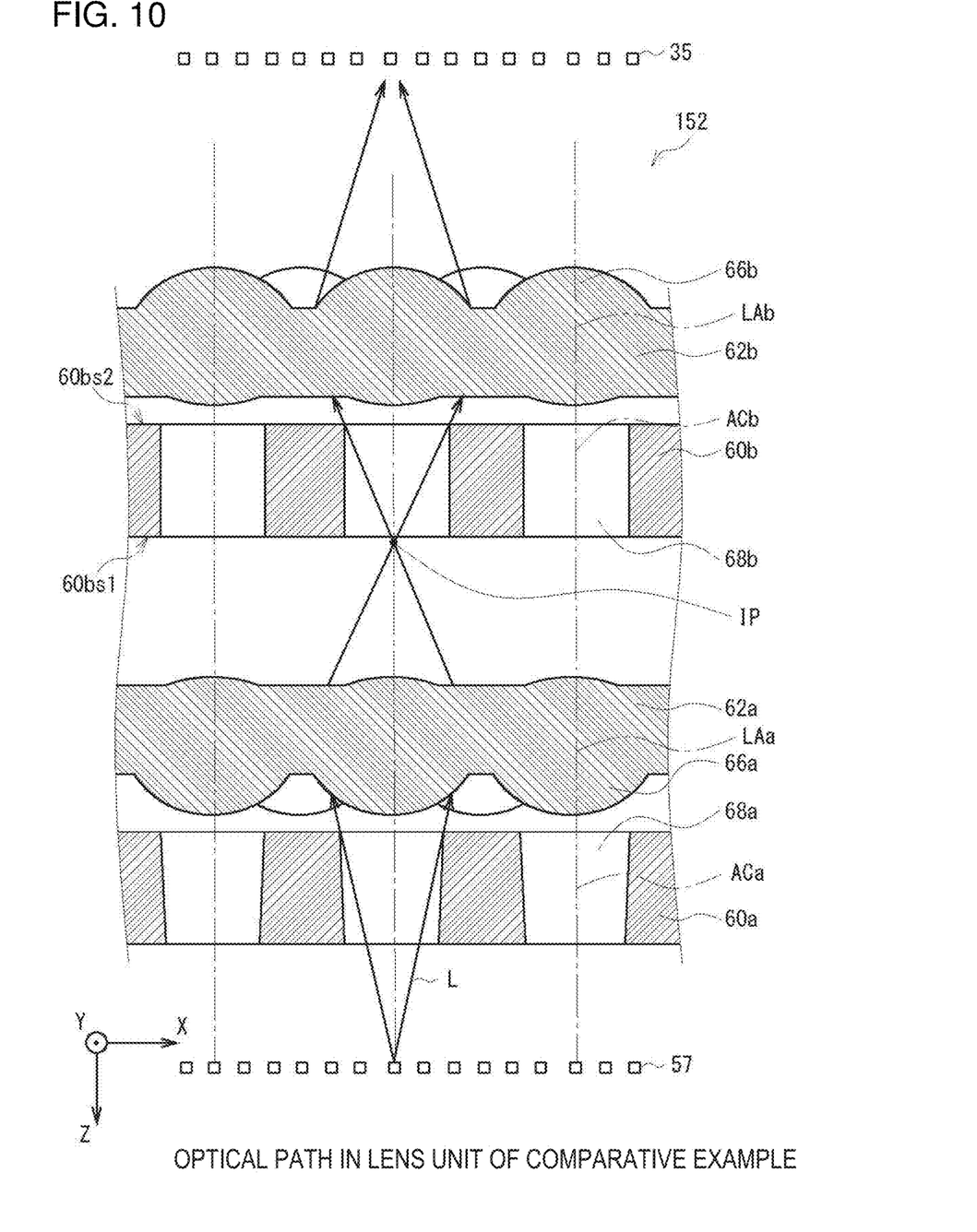
FIG. 10 is a sectional view illustrating an optical path in a lens unit in a comparative example.

An optical path of light L in a lens unit 152 in a comparative example is explained. As illustrated in FIG. 10, in the lens unit 152, the lens array 62a, the lens array 62b, the light blocking member 60a, and the light blocking member 60b are disposed such that the lens optical axis LAa, the lens optical axis LAb, the aperture center ACa, and the aperture center ACb coincide with one another.

In such a configuration, the light L emitted from the LED element 57 passes through the aperture section 68a of the light blocking member 60a while diverging and is made incident on the microlens 66a of the lens array 62a. The light L is partially blocked by passing through the aperture section 68a of the light blocking member 60a. Therefore, an amount of the light L made incident on the circumferential edge portion (the boundary portion) of the microlens 66a of the lens array 62a is limited. Subsequently, the light L passes through the microlens 66a of the lens array 62a and, while inverting and converging, forms an intermediate image (an inverted image) at an imaging point IP that is located in the center between the lens array 62a and the lens array 62b and is closer to the LED element 57 than the light-blocking-member light source-near side surface 60bs1 of the light blocking member 60b is. The light L passes through the aperture section 68b of the light blocking member 60b while diverging again and is made incident on the microlens 66b of the lens array 62b. The light L is partially blocked by passing through the aperture section 68b of the light blocking member 60b. Therefore, an amount of the light L made incident on the circumferential edge portion (the boundary portion) of the microlens 66b of the lens array 62b is limited. Subsequently, the light L passes through the microlens 66b of the lens array 62b and is applied to the photosensitive drum 35 while inverting and converging. Consequently, an image (an erected image) is formed on the photosensitive drum 35. In this way, the light blocking members 60a and 60b block stray light (a part of light) entering an optical system including the two microlenses 66a and 66b, the lens optical axes LAa and LAb of which coincide with each other, from another optical system and block the stray light not to exit to the other optical system.

[1-9. Optical Path According to the Embodiment]

An optical path of the light L in the lens unit 52 according to the embodiment is explained. As illustrated in FIG. 11, which is a sectional view taken along a plane along the X direction in the position of the microlenses 66 on the +Y-direction side in FIG. 4 and in which members corresponding to the members in FIG. 10 are denoted by the same reference numerals and signs, in the lens unit 52, the lens optical axis LAa and the lens optical axis LAb coincide with each other and the aperture center ACa and the aperture center ACb coincide with each other. However, the lens array 62a, the lens array 62b, the blocking member 60a, and the blocking member 60b are disposed such that the aperture center ACa and the aperture center ACb deviate in the −X direction by an offset amount dX with respect to the lens optical axis LAa and the lens optical axis LAb. The lens unit 52 is formed with the position in the X direction of the recesses 71 (FIG. 6) shifted in the +X direction by the offset amount dX from the center in the longitudinal direction (the X direction) of the light blocking members 60a and 60b.

Figure 13:
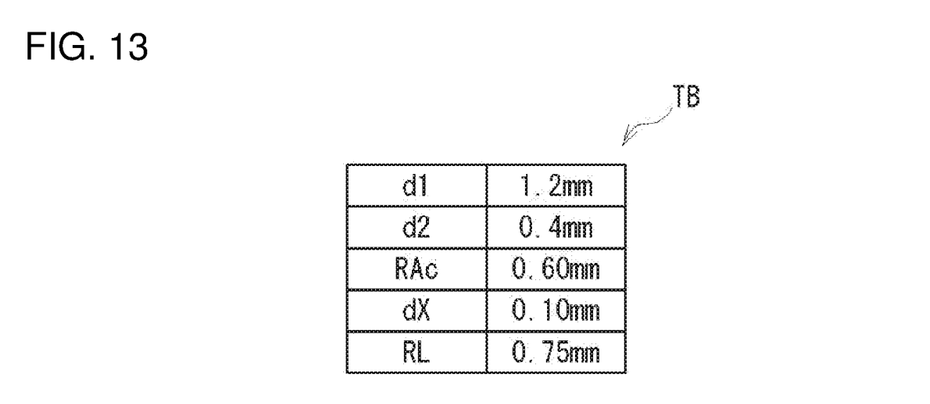
FIG. 13 is a table illustrating parameters.

In the lens unit 52, parameters illustrated in a parameter table TB in FIG. 13 are set. That is, in the lens unit 52, the distance d1 is set to 1.2 [mm], the distance d2 is set to 0.4 [mm], the aperture radius RAc is set to 0.60 [mm], the offset amount dX is set to 0.10 [mm], and the lens radius RL is set to 0.75 [mm].

In such a configuration, the light L emitted from the LED element 57 passes through the aperture section 68a of the light blocking member 60a while diverging and is made incident on the microlens 66a of the lens array 62a. The light L is partially blocked by passing through the aperture section 68a of the light blocking member 60a. Therefore, an amount of the light L made incident on the circumferential edge portion (the boundary portion) of the microlens 66a of the lens array 62a is limited. Specifically, a ray emitted to the +X-direction side in the light L is blocked by an inner wall surface on the +X side in the aperture section 68a of the light blocking member 60a. Subsequently, the light L passes through the microlens 66a of the lens array 62a and, while inverting and converging, forms an intermediate image (an inverted image) at the imaging point IP that is located in the center between the lens array 62a and the lens array 62b and is closer to the LED element 57 than the light-blocking-member light source-near side surface 60bs1 of the light blocking member 60b is. The light L passes through the aperture section 68b of the light blocking member 60b while diverging again and is made incident on the microlens 66b of the lens array 62b. The light L is partially blocked by passing through the aperture section 68b of the light blocking member 60b. Therefore, an amount of the light L made incident on the circumferential edge portion (the boundary portion) of the microlens 66b of the lens array 62b is limited. Subsequently, the light L focuses and forms an inverted image further on the LED element 57 side than the blocking-member counter-light source side surface 60bs2 of the light blocking member 60b. Therefore, a ray emitted to the −X-direction side in the light L is blocked by an inner wall surface on the +X side in the aperture section 68b of the light blocking member 60b. Subsequently, the light L passes through the microlens 66b of the lens array 62b and is irradiated on the photosensitive drum 35 while inverting and converging. Consequently, an image (an erected image) is formed on the photosensitive drum 35.

Figures 12A, 12B:
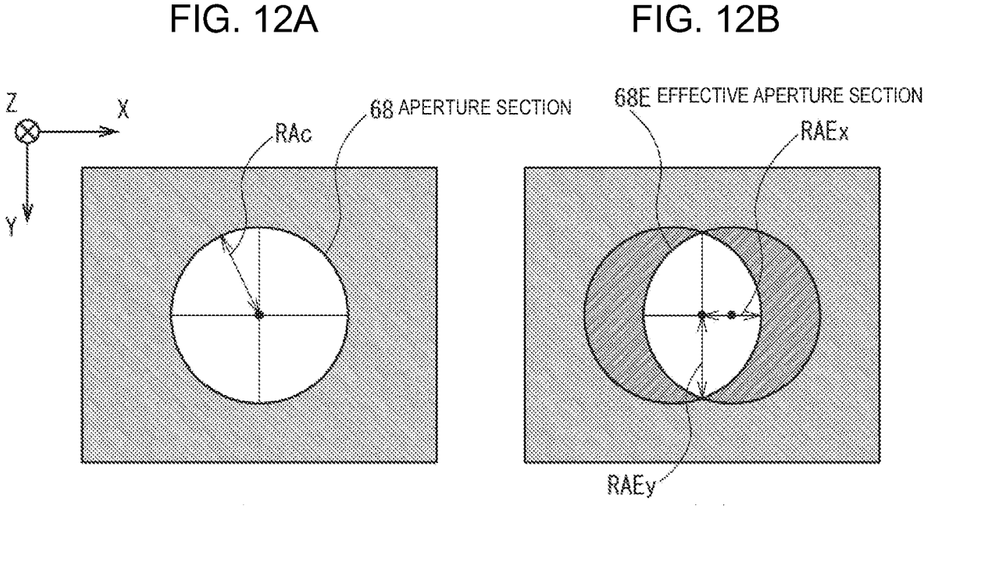
FIGS. 12A and 12B are bottom views illustrating an actual aperture section and an effective aperture section.

As illustrated in FIG. 12A, the aperture section 68 of the light blocking member 60 is formed in a circular shape having the aperture radius RAc. On the other hand, in the lens unit 52, the aperture center ACa and the aperture center ACb are deviated in position in the −X direction, which is the same direction, by the offset amount dX with respect to the lens optical axis LAa and the lens optical axis LAb. The blocking member 60b is disposed close to the lens array 62b such that the imaging point IP is closer to the LED element 57 than the light-blocking-member light source-near side surface 60bs1 of the light blocking member 60b is. Therefore, in the lens unit 52, a ray emitted to the +X-direction side in the light L can be blocked by the aperture section 68a of the light blocking member 60a. A ray emitted to the −X-direction side in the light L can be blocked by the aperture section 68b of the light blocking member 60b. Consequently, in the lens unit 52, a region where light actually focused on the photosensitive drum 35 passes can be formed in a shape close to an ellipse like an effective aperture section 68E illustrated in FIG. 12B, although an actual shape of the aperture section 68 of the light blocking member 60 is formed in a simple circular shape as illustrated in FIG. 12A. The effective aperture section 68E can be approximated to an ellipse. Therefore, a radius in the X direction, which is a minor axis radius of the effective aperture section 68E, is represented as an aperture-effective X-direction radius RAEx. A radius in the Y direction, which is a major axis radius of the effective aperture section 68E, is represented as an aperture-effective Y-direction radius RAEy.

Figure 14:
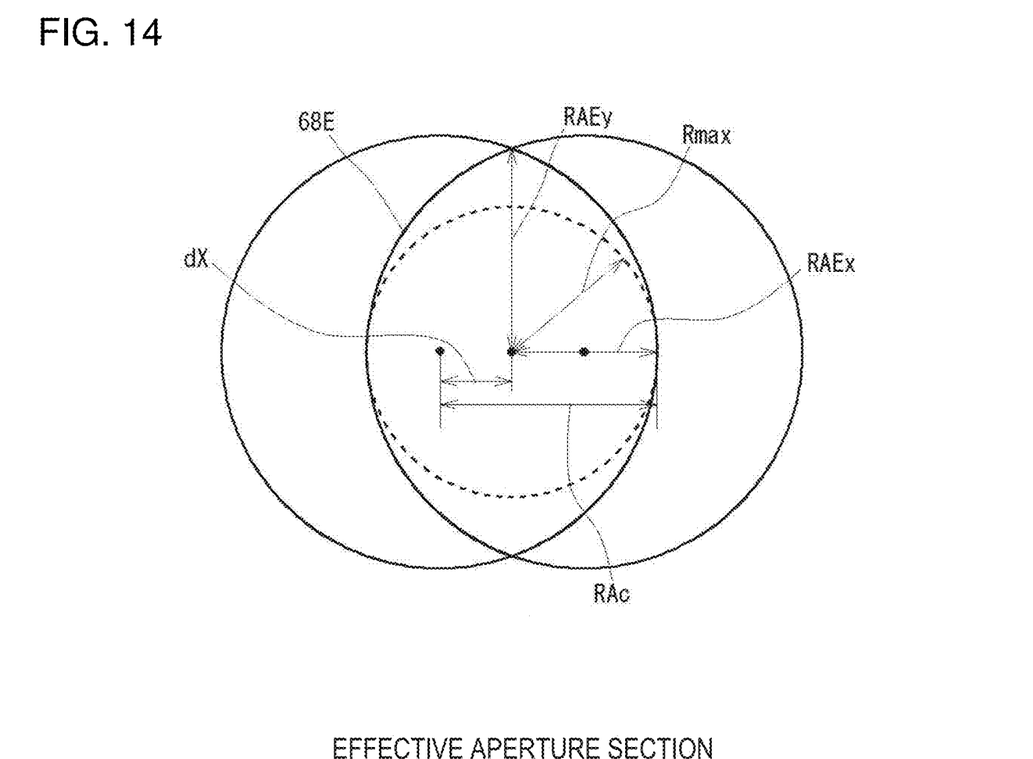
FIG. 14 is a diagram illustrating an effective aperture section.

The effective aperture section 68E illustrated in FIG. 12B is illustrated in FIG. 14. From a geometrical relation, the aperture-effective X-direction radius RAEx is calculated by Expression 2.

$$RAEx = RAc - dX \quad (2)$$

The aperture-effective Y-direction radius RAEy is calculated by Expression 3.

$$RAEy = \sqrt{RAc^2 - dX^2} \quad (3)$$

A lens shape easily deviates from a design value near a lens boundary. Therefore, an effective diameter of the microlens 66 is approximately 0.8 times of a distance to the lens boundary. Therefore, a maximum aperture radius Rmax designable in a circle is calculated by Expression 4.

$$Rmax = 0.8 \times LD/2 \quad (4)$$

In this embodiment, since light is desired to be made incident on a wider range, a condition of the aperture radius RAc of the light blocking member 60 is Expression 5.

$$0.8 \times LD/2 < RAc < LD/2 \quad (5)$$

The upper limit of the aperture radius RAc is set to LD/2 in Expression 5 in order to prevent the aperture sections 68 adjacent to each other from being joined.

An imaginary aperture shape (the effective aperture section 68E) obtained by shifting the aperture center AC of the light blocking member 60 with respect to the lens optical axes LA can be approximated to an ellipse as explained above. Since the effective diameter of the microlens 66 is the same in this embodiment, Expression 6 needs to be satisfied.

$$RAEx < Rmax \quad (6)$$

That is, a lower limit value, which is a first condition that the offset amount dX should satisfy, is Expression 7 obtained by substituting Expression 2 and Expression 4 in Expression 6.

$$dX > RAc - 0.8 \times LD/2 \quad (7)$$

If an aperture area of an imaginary ellipse (the effective aperture section 68E) according to this embodiment is larger than an aperture area in the case of the maximum aperture radius Rmax, a more effect is obtained than the comparative example. If the aperture area of the imaginary ellipse is approximated by an elliptical shape having the aperture-effective Y-direction radius RAEy (the major axis radius) and the aperture-effective X-direction radius RAEx (the minor axis radius), an upper limit value, which is a second condition, is Expression 8.

$$\pi \times RAEx \times RAEy > \pi \times (0.8 \times LD/2)^2 \quad (8)$$

The left side of Expression 8 is the aperture area of the imaginary ellipse. The right side of Expression 8 is the aperture area in the comparative example. Expression 9 is obtained by substituting Expression 2 and Expression 3 in Expression 8.

$$(RAc - dX) \times \sqrt{RAc^2 - dX^2} > (0.8 \times LD/2)^2 \quad (9)$$

From Expression 7 and Expression 9, if the aperture radius RAc and the lens interval LD are decided, a range in which the offset amount dX should be set is decided.

[1-10. Effects]

The shape of the circumferential edge portion of the microlens 66 is deteriorated because of molding to cause flare light. Therefore, an optical characteristic is deteriorated in the circumferential edge portion compared with the center of the microlens 66. Light passing the circumferential edge portion of the microlens 66 is desirably prevented from reaching the photosensitive drum 35.

On the other hand, in the lens unit 52, the aperture center ACa and the aperture center ACb are deviated in position in the −X direction by the offset amount dX with respect to the lens optical axis LAa and the lens optical axis LAb. The blocking member 60b is disposed close to the lens array 62b such that the imaging point IP is located closer to the LED element 57 than the light-blocking-member light source-near side surface 60bs1 of the light blocking member 60b is.

Therefore, in the lens unit 52, a ray emitted to the +X-direction side in the light L emitted from the LED element 57 can be blocked by the light blocking member 60a. A ray emitted to the −X-direction side in the light L can be blocked by the light blocking member 60b. Consequently, in the lens unit 52, the aperture sections 68 of the light blocking members 60 can be formed in a circular shape. Therefore, pins corresponding to the aperture sections 68 in a mold can be formed in a columnar shape that is easily manufactured. A mold of the light blocking member 60 can be easily and inexpensively manufactured.

In the lens unit 52, an effective elliptical aperture section having a minor axis in the X direction, which is a direction in which the lens optical axes LA and the aperture centers AC are deviated in position, can be realized using the light blocking member 60 including the circular aperture sections 68 that is easily manufactured. That is, the lens unit 52 can perform, with the circular aperture sections 68 that is simple and easily manufactured, light blocking close to light blocking performed when an aperture shape is formed in a complicated elliptical shape. Consequently, the lens unit 52 can limit light made incident on the circumferential edge portions of the microlenses 66, although the aperture sections 68 are simply configured, and improve optical performance.

If the light blocking member 60*b* is disposed away from the lens array 62*b* in the +Z direction such that the imaging point IP is located farther from the LED element 57 than the light-blocking-member light source-far side surface 60*bs*2 of the light blocking member 60*b* is, that is, on a lens array 62*b* side, a ray emitted to the +X-direction side in the light L emitted from the LED element 57 is blocked by the inner wall surface on the +X side in the aperture section 68*a* of the light blocking member 60*a*. However, in order to block a ray emitted to the −X-direction side, in the light blocking member 60*b*, unlike the light blocking member 60*a*, the aperture center ACb needs to be deviated in position in the +X direction with respect to the lens optical axis LAa and the lens optical axis LAb. In this case, the lens unit 52 is increased in length in the longitudinal direction (the X direction). It is difficult to reduce the size of the lens unit 52.

On the other hand, in the lens unit 52, the light blocking member 60*b* is disposed close to the lens array 62*b* such that the imaging point IP is located closer to the LED element 57 than the light-blocking-member light source-far side surface 60*bs*2 of the light blocking member 60*b* is. Therefore, in the lens unit 52, after the lens array 62*a* inverts an image, the image is blocked by the light blocking member 60*b*. Therefore, a ray emitted to the −X-direction side can be blocked by the inner wall surface on the +X side in the aperture section 68*b* of the light blocking member 60*b*. Consequently, in the lens unit 52, the ray emitted to the +X-direction side and the ray emitted to the −X-direction side in the light L emitted from the LED element 57 can be blocked simply by offsetting the light blocking member 60*a* and the light blocking member 60*b* in the same direction in the X direction. In this way, in the lens unit 52, it is possible to prevent light passing the circumferential edge portion of the microlens 66 from being irradiated on the photosensitive drum 35 and improve imaging performance while preventing the lens unit 52, that is, the LED head 16 from being excessively increased in the length in the longitudinal direction (the X direction) and reducing the size of the lens unit 52, that is, the LED head 16 as much as possible.

With the configuration explained above, the LED head 16 of the color printer 1 includes the LED array 56, the light blocking member 60*a* disposed to be opposed to the LED array 56 and including the aperture section 68*a* functioning as the first aperture for blocking a part of light from the LED array 56, the lens array 62*a* in which the microlenses 66*a* functioning as the first lenses that converge the light passing through the aperture section 68*a* are disposed, the light blocking member 60*b* disposed on the opposite side of the light blocking member 60*a* and including the aperture section 68*b* functioning as the second aperture for blocking a part of the light from the microlens 66*a*, and the lens array 62*b* in which the microlenses 66*b* functioning as the second lenses that converge the light passing through the aperture section 68*b* are disposed. The lens optical axis LAa, which is the optical axis of the microlens 66*a*, and the lens optical axis LAb, which is the optical axis of the microlens 66*b*, substantially coincide with each other. The aperture center ACa functioning as the first aperture center of the aperture section 68*a* and the aperture center ACb functioning as the second aperture center of the aperture section 68*b* are disposed at the offset amount dX, which is a predetermined distance, in the X direction, which is the array direction of the LED array 56, with respect to the lens optical axis LAa and the lens optical axis LAb. Consequently, the LED head 16 can limit light made incident on the circumferential edge portion of the microlens 66 in the light blocking member 60, although the aperture section 68 of the lens array 62 is simply configured, and improve optical performance.

[2. Other Embodiments or Modifications]

In the above described one or more embodiments, the aperture section 68 is formed in the circular shape and the center of the circle is set as the aperture center AC. The disclosure is not limited to this. The aperture section may be formed in any shape such as a triangle, a square, a pentagon, or a hexagon. When the aperture section is formed in a shape other than the circular shape, the aperture center of the aperture section only has to be set in the center of gravity position of the aperture section. However, manufacturing is particularly easy when the aperture section is formed in the circular shape.

In the above described one or more embodiments, the aperture section 68*a* and the aperture section 68*b* are formed in the same circular shape when viewed from the optical axis direction. The disclosure is not limited to this. The aperture section 68*a* and the aperture section 68*b* may be formed in shapes different from each other.

Further, in the above described one or more embodiments, the light blocking member 60*b* is disposed close to the lens array 62*b* such that the imaging point IP is located closer to the LED element 57 than the light-blocking-member light source-near side surface 60*bs*1 of the light blocking member 60*b*. The disclosure is not limited to this. The light blocking member 60*b* may be disposed away from the lens array 62*b* in the +Z direction such that the imaging point IP is located farther from the LED element 57 than the light-blocking-member light source-near side surface 60*bs*1 of the light blocking member 60*b* is, that is, on the lens array 62*b*.

Further, in the above described one or more embodiments, the microlenses 66 of the lens array 62 and the aperture sections 68 of the light blocking member 60 are arrayed in the two rows. The disclosure is not limited to this. The microlenses 66 of the lens array 62 and the aperture sections 68 of the light blocking member 60 may be arrayed in any number of rows such as one row or three or more rows.

Further, in the above described one or more embodiments, the aperture center ACa and the aperture center ACb are deviated in position in the X direction, which is the array direction of the microlenses 66, with respect to the lens optical axis LAa and the lens optical axes LAb. The disclosure is not limited to this. The aperture center ACa and the aperture center ACb may be deviated in position in the Y direction with respect to the lens optical axis LAa and the lens optical axis LAb.

Further, in the above described one or more embodiments, the lens unit 52 is applied to the LED head 16 functioning as the exposing device. The disclosure is not limited to this. The lens unit 52 may be applied to an image reading apparatus by disposing an object instead of the LED array 56 and disposing a detector instead of the photosensitive drum 35.

Further, in the above described one or more embodiments, in the tandem color printer 1, the disclosure is applied to the LED heads 16 of the colors respectively corresponding to the image forming units 15 of the colors disposed in series along the front-rear direction. The disclosure is not limited to this. For example, the disclosure may be applied to LED heads mounted on color printers of other various types such as a four-cycle type.

Further, in the above described one or more embodiments, the four LED heads 16 corresponding to the colors of yellow, magenta, cyan, and black are attached to the printer housing 2 of the color printer 1 that performs color printing. The disclosure is not limited to this. Three or less or five or more LED heads 16 may be attached to the printer housing 2 according to, for example, the number of colors of toners used in a color printer. One LED head 16 may be attached in a monochrome printer that performs monochrome printing.

Further, in the above described one or more embodiments, the disclosure is applied to the color printer 1 functioning as the image forming apparatus. The disclosure is not limited to this. The disclosure can be applied to apparatuses such as a facsimile, a multifunction printer (MFP), and a copying machine as well if the apparatuses include the LED heads 16 like the color printer 1.

Further, in the above described one or more embodiments, the LED head 16 functioning as the exposing device is configured by the LED array 56 functioning as the light emitter, the light blocking member 60a functioning as the first light blocking member, the lens array 62a functioning as the first lens array, the light blocking member 60b functioning as the second light blocking member, and the lens array 62b functioning as the second lens array. The color printer 1 functioning as the image forming apparatus including the LED head 16 is configured. The disclosure is not limited to this. An exposing device may be configured by a light emitter, a first light blocking member, a lens array, a second light blocking member, and a lens array having other various configurations. An image forming apparatus including the exposing device may be configured.

The disclosure can be used in an LED head mounted on, for example, an electrophotographic printer.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An exposing device comprising:
a light emitter;
a first light blocking member that is opposed to the light emitter, includes first apertures, and blocks a part of light emitted from the light emitter;
a first lens array in which first lenses are disposed, wherein each of the first lenses converges light passing through a corresponding first aperture;
a second light blocking member that is disposed on an opposite side of the first light blocking member with respect to the first lens array, includes second apertures, and blocks a part of light coming from the first lenses; and
a second lens array in which second lenses are disposed, wherein each of the second lenses converges light passing through a corresponding second aperture, wherein
an optical axis of each of the first lenses and an optical axis of a corresponding one of the second lenses coincide with each other, and
a first aperture center of each of the first apertures and a second aperture center of a corresponding second aperture are disposed at a predetermined distance from the optical axis of a corresponding first lens and the optical axis of a corresponding second lens in an array direction of the light emitter, such that the first aperture center of each of the first apertures and the second aperture center of each of the corresponding second apertures are not aligned with the optical axis of the corresponding first lens and the optical axis of the corresponding second lens in the array direction.

2. The exposing device according to claim 1, wherein each of the first lenses inverts light passing through the corresponding first aperture, and
the first aperture center of each of the first apertures and the second aperture center of the corresponding second aperture are disposed at the predetermined distance from the optical axis of the corresponding first lens and the optical axis of the corresponding second lens in a same direction.

3. The exposing device according to claim 2, wherein the second light blocking member includes a first surface and a second surface provided further from the light emitter than the first surface, and
an imaging point of light passing through each of the first lenses is located closer to the light emitter than the second surface of the second light blocking member.

4. The exposing device according to claim 1, wherein the first apertures and the second apertures are circular.

5. The exposing device according to claim 1, wherein the exposing device satisfies the following Expression 1 and Expression 2:

$$dX > RAc - 0.8 \times LD/2 \qquad (1), \text{ and}$$

$$(RAc - dX) \times \sqrt{RAc^2 - dX^2} > (0.8 \times LD/2)^2 \qquad (2),$$

where an interval between the first lenses, between the second lenses, between the first apertures, and between the second apertures is represented as LD, an aperture radius of each of the first apertures and the second apertures is represented as RAc, and the predetermined distance is represented as dX.

6. The exposing device according to claim 1, wherein the exposing device satisfies $d < 2RL$,
where an interval between adjacent first lenses and an interval between adjacent second lenses is represented as d and a radius of each of the first lenses and the second lenses is represented as RL.

7. The exposing device according to claim 1, wherein the first lenses, the second lenses, the first apertures, and the second apertures are arrayed in two rows.

8. The exposing device according to claim 1, wherein the second lens array is symmetrical to the first lens array about a straight line orthogonal to the array direction and an optical axis direction.

9. An image forming apparatus comprising the exposing device according to claim 1.

10. An image forming apparatus comprising:
the exposing device according to claim 1; and
a photosensitive member on which light emitted from the light emitter and passed through the first light blocking member, the first lens array, the second light blocking member, and the second lens array is focused.

* * * * *